United States Patent [19]

Sato

[11] 4,344,452

[45] Aug. 17, 1982

[54] WATER FEED VALVE WITH SPRINKLING HOLES

[76] Inventor: Matsuo Sato, No. 3-47, Nishinagasu-Higashidori, Amagasaki, Japan

[21] Appl. No.: 240,944

[22] Filed: Mar. 5, 1981

[51] Int. Cl.³ .............................................. F16K 51/00
[52] U.S. Cl. .................................. 137/238; 137/801; 137/883; 239/113
[58] Field of Search .............. 137/238, 883, 886, 801; 222/148, 486; 239/25, 26, 27, 31, 113

[56] References Cited

U.S. PATENT DOCUMENTS

| | | | |
|---|---|---|---|
| 899,330 | 9/1908 | Schierloh | 137/801 |
| 979,489 | 12/1910 | Heeney | 239/26 |
| 1,096,406 | 5/1914 | Tunnicliffe | 239/25 |
| 1,149,856 | 8/1915 | Piper | 239/25 |
| 1,240,260 | 9/1917 | Rudolph | 239/25 |
| 1,392,456 | 10/1921 | Spatter et al. | 239/25 |
| 1,555,618 | 9/1925 | Aselin | 239/5 |
| 1,563,344 | 12/1925 | Corbett | 137/801 |

FOREIGN PATENT DOCUMENTS

| | | | |
|---|---|---|---|
| 20090 | 10/1935 | Australia | 239/25 |
| 25-9642 | 10/1949 | Japan | |
| 39-20611 | 7/1964 | Japan | |
| 44-11581 | 5/1969 | Japan | |

*Primary Examiner*—H. Jay Spiegel
*Attorney, Agent, or Firm*—Oblon, Fisher, Spivak, McClelland & Maier

[57] ABSTRACT

A water feed valve or faucet which is adapted to remove soiling or filth adhering to the surface of its handle portion by a shower or water streams automatically formed whenever the feed valve is used. The feed valve is so arranged that a water passage is formed in a valve operating shaft of the feed valve, while a water sprinkling member is provided at the top portion of the handle so as to cause part of the discharged water to flow out through the top portion of the handle when the feed valve is opened.

2 Claims, 8 Drawing Figures

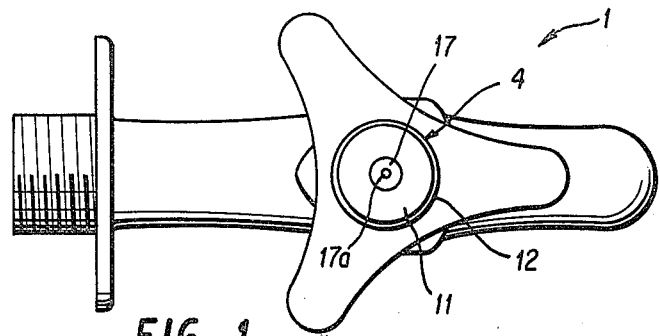
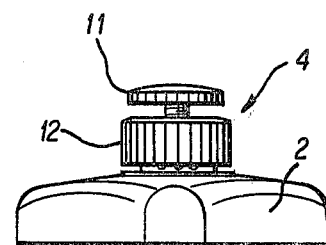
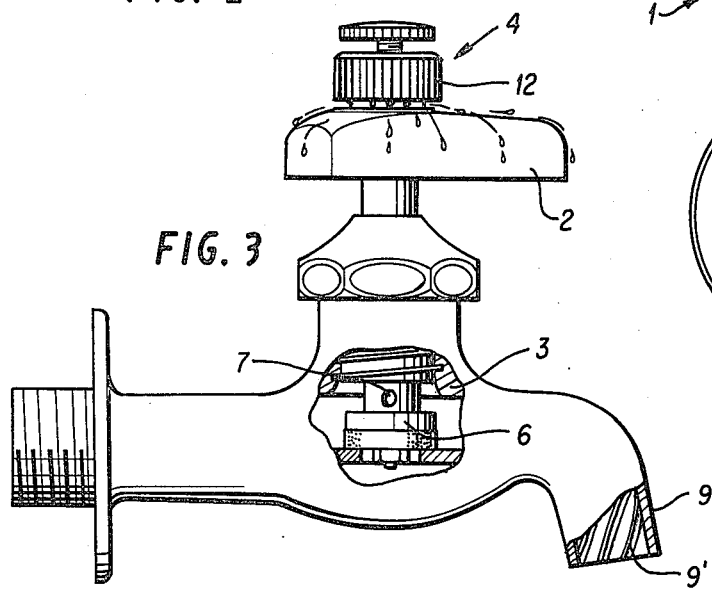
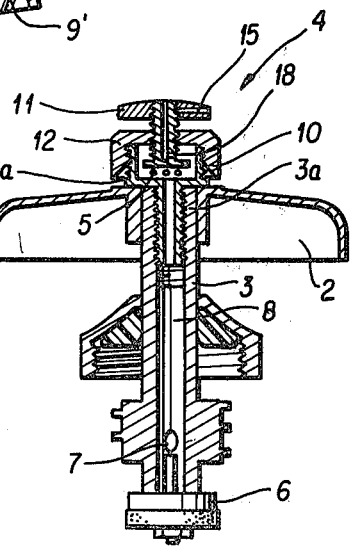
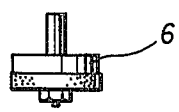
FIG. 1
FIG. 2
FIG. 3
FIG. 4
FIG. 5

WATER FEED VALVE WITH SPRINKLING HOLES

BACKGROUND OF THE INVENTION

1. Field of the Invention

The present invention generally relates to a water feed valve and, more particularly, to an improved feed valve or faucet (referred to as a feed valve hereinbelow) provided with sprinkling holes for water.

2. Description of the Prior Art

Generally, water feed valves having handles to be manually operated for selective opening or closing thereof are installed at terminal water supply spots both indoors and outdoors. In the actual use, however, since the handles are operated with soiled or filthy hands in many cases, soiling or filth which has adhered to the handles before washing hands, remain on the handles as it is. Therefore, when the feed valve is to be operated again to stop water, after the hands, feet, and the face or the like have been completely washed clean, the hands, etc. which have been carefully washed, are undesirably soiled again by the filthy handle.

Examples of such inconveniences as described above are as follows:

(1) When the feed valve is touched with soiled hands after work, etc. and then, operated again to stop the water after the hands have been cleaned.
(2) When the feed valve is touched by hands applied with soap, and then, operated again after the hands have been cleaned, the soapy water adhering to the feed valve is caused to adhere to the hands repeatedly.
(3) When the feed valve is touched with hands soiled by earth in gardening work, etc., and subsequently operated after the hands have been cleaned, the muddy water is caused to adhere to the hands again.

The instances as described above are not limited to the cases at homes, but may be found in an extremely wide range of spots such as restaurants, public lavatories, factories, etc. Accordingly, it has been a conventional practice to clean the handles of the feed valves after use for avoiding an unpleasant feeling, but such a practice has not actually been fully carried out, since it is rather troublesome and time consuming. Furthermore, the practice as described above is unsanitary, since invisible contamination, for example, by various bacteria and the like tends to be overlooked, although visible soiling may be readily removed. In order to overcome the disadvantages as described above, there has been conventionally proposed a feed valve which can be opened or closed without directly using hands. However, such known feed valve is not only expensive, but requires an electrical control facility for operation. Under such circumstances, there has been a strong demand for a feed valve which can be readily applied to the existing feed valves, and is capable of automatically cleaning the handle during water supply.

SUMMARY OF THE INVENTION

Accordingly, it is a primary object of the present invention to provide an improved water feed valve of automatic washing type which may be readily applied to existing feed valves, and be capable of automatically cleaning the handle during water supply, with substantial elimination of disadvantages inherent in the conventional water feed valves.

BRIEF DESCRIPTION OF THE DRAWINGS

Various other objects features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a top plan view of a feed valve according to one preferred embodiment of the present invention, FIG. 2 is a front elevational view of the feed valve of FIG. 1, FIG. 3 is a side elevational view, partly broken away, of the feed valve of FIG. 1, FIG. 4 is a fragmentary front elevational view showing, partly in section, the main portion of the feed valve of FIG. 1, FIG. 5 is a longitudinal sectional view of the main portion of FIG. 4.

DETAILED DESCRIPTION OF THE PREFERRED EMBODIMENTS

Figure 6:
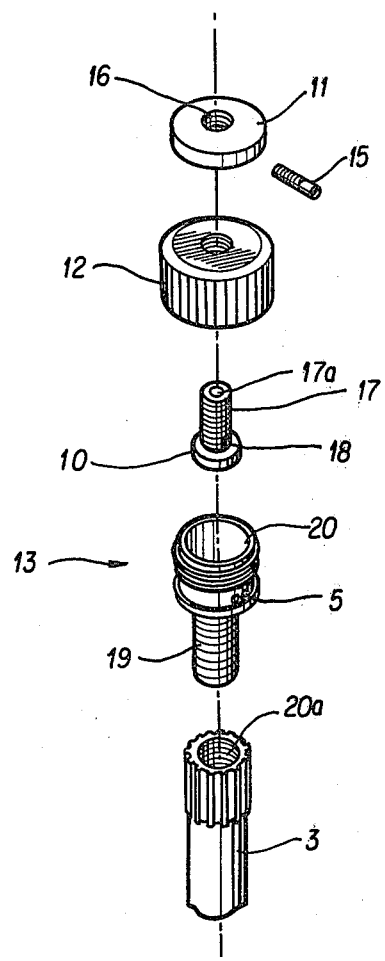
FIG. 6 is an exploded view of the arrangement of FIG. 4, with the handle removed for clarity.

The feed valve according to the present invention is so arranged that a sprinkling member 4 for cleaning the feed valve is provided at the central upper portion of a handle 2 so as to form cleaning water streams on the surface of the handle 2 simultaneously with starting of the water supply from a water supply port 9.

In the feed valves generally employed, water is fed to the water supply port 9 upon opening (i.e. raising) of a valve 6.

According to the present invention, however, it is intended to form a passage of cleaning water through utilization of part of the water fed in the above described manner. More specifically, the valve 6 is adapted to selectively open or close the water supply introduction port through an operating shaft 3, and according to the arrangement of the present invention, a water passage 8 is provided in the operating shaft 3 as described above, while a plurality of inlet openings 7 are formed at the lower portion of the operating shaft 3 so as to guide part of the water introduced from the inlet openings 7 to a sprinkling member 4 mounted on the upper portion of the operating shaft 3 through the water passage 8 formed in the operating shaft 3, whereby the water is evenly discharged onto the upper surface of the handle 2 through water discharge distribution holes 5 formed in the sprinkling member 4.

Referring to FIGS. 5 and 6 showing the detailed constructions of the valve operating shaft 3 and water sprinkling member 4 of the water feeding valve 1, the sprinkling member 4 mounted on the valve operating shaft 3 comprises a water discharge distribution pipe 13 coaxially threaded into the shaft 3 with respect to the water passage 8, and a sprinkling cap 12, with the water discharge distribution pipe 13 being screwed, at a threaded cylindrical portion 19 formed at the lower portion thereof, into a corresponding threaded bore 20a formed at the upper portion of the operating shaft 3. Moreover, at the upper side of the inserting member 13, there is formed a valve chamber 20, while the plurality of water discharge distribution holes 5 are formed at opposite sides thereof as shown.

Meanwhile, a valve shaft 17 having a valve seat 10 formed at its axis is threaded into the central portion of the sprinkling cap 12, while the valve seat 10 is arranged to open or close the water lifting hole of said threaded cylindrical portion 19. Furthermore, the valve shaft 17 is formed therein with a water passage 17a, which is not extended through the valve seat 10, but is communicated with the top surface through a flow-in port 18 provided in the valve shaft 17 at the side of the valve seat 10 thereof. Onto the forward end of the valve shaft 17 extending out of the sprinkling cap 12, a ring 11 is threaded, and fixed thereat, for example, by the use of a retaining pin 15. Alternatively, the ring 11 may be fixed by another mechanism. In the sprinkling member 4 having the construction as described above, the water introduced through the water passage 8 of the operating shaft 3 can be led into the valve chamber 20, and according to the degrees of opening and closing of the valve seat 10, the water is caused to flow out of the water discharge distribution holes 5 so as to form water streams on the surface of the handle 2. Meanwhile, part of the water within the valve chamber 20 is caused to flow over the upper surface of the ring 11 through the flow-in port 18 for cleaning the upper surface of the ring 11. It is to be noted here that, since there may be causes where the ring 11 is not necessarily touched by a hand, the object of the present invention can be achieved by the water streams only through the water discharge distribution holes 5. It should also be noted that the sprinkling water streams have only to be formed at the water flowing portion of the handle 2, and that the water discharge distribution holes 5 should preferably be opened to the directed towards the operating portion of the handle 2 so as to obtain water streams in a plane corresponding to an inclined surface 12a (FIG. 5) formed at the inner peripheral lower edge of the sprinkling cap 12 described earlier. Additionally, in the case where the cleaning water streams are not required, valve seat 10 may be lowered through the ring 11 for blocking the water lifting hole 3a, but normally, the valve seat 10 may be lifted by raising the ring 11 to provide a gap between the valve seat 10 and the water lifting hole 3a so that the water introduced from the inlet openings 7 of the operating shaft 3 can be sprinkled over the handle 2 through the water discharge distribution holes 5 at the same time as the opening of the feed valve 1, and also sprinkled over the ring 11 through the communication port 18.

It should further be noted here that, in the foregoing embodiment, although the water discharge distribution holes 5 are described being provided at three positions to suit to the configuration of the handle 2 for sprinkling towards the projecting portions of the handle 2, the number and positions of the water discharge distribution holes 5 need not necessarily be in line with the configuration of the handle 2. In short, insofar as the water discharge distribution holes are so arranged that the water sprinkled therefrom are evenly applied onto the entire upper surface and peripheral surface of the handle 2, the number and configuration thereof are not limited to those illustrated in the drawings, but may be modified in various ways.

As is clear from the foregoing description, according to the arrangement of the present invention, since the cleaning water is sprinkled simultaneously the opening of the feed valve for washing the soiled handle 2, the feed valve is maintained in a clean state at all times. Accordingly, even if the handle should be turned by a soiled hand as described earlier in items (1), (2) and (3), the handle 2 is immediately cleaned by the sprinkling of water, and thus, kept in an extremely clean state. Therefore, even when the handle is touched again by the washed hand, there is no possibility that the handle is again brought into the filthy state. It is to be noted here that, if a water stream guide 9' to be mounted in the water supply port 9 is arranged to be one twisted into a spiral shape, the water to be supplied falls while being twisted, with consequent consumption of the falling energy, and thus, splashing from the falling water is appreciably reduced.

Figure 7:
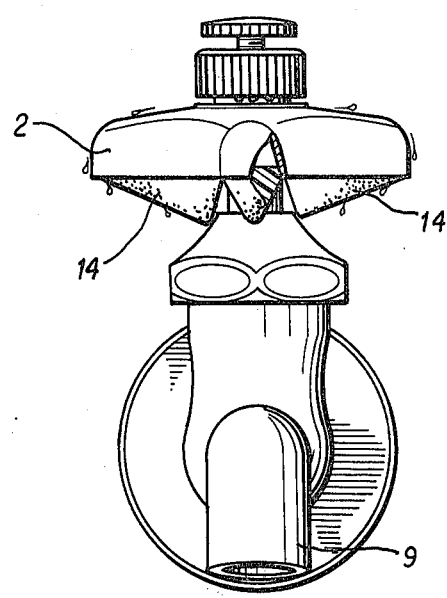
FIG. 7 is a view similar to FIG. 2, but particularly shows a modification thereof.

Referring to FIG. 7 showing a modified feed valve in which the cleaning water sprinkled on the handle 2 is not splashed therearound, there is mounted a guide plate 14 at the under surface of the handle 2 so as to direct the cleaning water dripping through the handle 2 along the feed valve without scattering, which arrangement is favorable for cleaning the feed valve on the whole.

Figure 8:
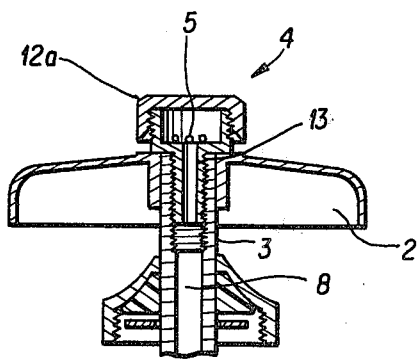
FIG. 8 is a view similar to FIG. 5, but particularly shows another modification thereof.

Referring to FIG. 8, there is shown another modification of the feed valve of FIG. 5, in which the valve seat 10 and the ring 11 described as employed in the arrangement of FIG. 6 are omitted. More specifically, in the modified feed valve of FIG. 8, the cleaning water which flows into the cap 12a through the water passage 8 is not retained in the water discharge distribution pipe 13, but, simultaneously with the starting of water supply by the feed valve 1, water streams are formed at all times from the water discharge distribution holes 5 to the side of the handle 2 for cleaning said handle 2.

Subsequently, comparison was made on the result of sprinkling cleaning by the feed valve according to the present invention with respect to the number of bacteria, with the findings as follows.

Testing method

By the stamp of a sterilized stamp bottle (made by Eiken Kizai K.K.), the 3 side faces and upper surface of the feed valve was subjected to stamping as desired, and 5 ml of sterilized water was poured into the stamp bottle, with subsequent sufficient shaking. Thereafter, 1 ml of the sterilized water as a specimen was subjected to cultivation by the standard agar plate (made by Eiken Kagaku K.K.) for 48 hours to judge the state of growth of bacteria.

Test result

When the feed valves of the present invention and the conventional feed valves were installed at the washing basins in a lavatory, bacteria of 140 pcs./ml were detected in the conventional feed valves, while in the feed valves of the present invention, the number of bacteria detected was 0 pc./ml.

Since the feed valve according to the present invention is constructed as described above, there are various advantages as described hereinbelow.
(1) Even if the hands about to touch the feed valve are extremely soiled, the handle of the feed valve is kept clean at all times, since the cleaning water is sprinkled simultaneously with the water supply.
(2) Owing to the arrangement that the cleaning is effected through utilization of part of the city water to be supplied, there is no increase in the water consumption as compared with the conventional arrangements.

(3) Since the feed valve is extremely simple in construction and further, may be applied to the existing feed valve being used, it is very economical from the view point of cost.

While the present invention has been fully described so far with reference to the preferred embodiments thereof, there will further be various changes and modifications within the scope. Therefore, unless such changes and modifications depart from the scope of the present invention, they should be considered as included therein.

What is claimed is:

1. A water feed valve comprising:
   a handle;
   a valve operating shaft having a water passage formed therein along the longitudinal axis of the valve operating shaft and a flow-in hole formed at the lower side of said operating shaft so as to be communicated with a side of a water supply passage, said water passage being opened at approximately the central portion of a top surface of said handle which is mounted at the upper portion of the valve operating shaft; and
   a water sprinkling member mounted to said opened portion to thereby form water streams on the upper surface of the handle from said water sprinkling member at the same time the supply water is started by operation of said water feed valve wherein said water sprinkling member is provided with a water exiting orifice communicated with said water passage of said operating shaft and also formed with a plurality of water discharge distribution holes at the upper peripheral surface thereof, wherein said water sprinkling member further comprises a water discharge distribution pipe having said plurality of discharge water distribution holes formed at a junction with respect to the operating shaft and the peripheral surface thereof and located concentrically surrounding said valve operating shaft and overlying said handle, and a cap member for blocking the top portion of said distribution pipe and wherein said cap member comprises a cap with an open/close valve which includes a valve shaft having a valve element selectively contacting the water exiting orifice of the water sprinkling member so as to selectively control flow of water to said discharge water distribution holes, said cap further including means to deflect the flow of water through said discharge water distribution holes onto said handle.

2. A water feed valve as claimed in claim 1, wherein said valve operating shaft comprises a cylindrical valve operating shaft, and is provided with a flow-in port at a side face thereof higher in position than said valve element.

* * * * *